(12) United States Patent
Deore et al.

(10) Patent No.: US 11,042,393 B2
(45) Date of Patent: Jun. 22, 2021

(54) PRIMING VIRTUAL MACHINES IN ADVANCE OF USER LOGIN IN VIRTUAL DESKTOP ENVIRONMENTS

(71) Applicant: VMware, Inc., Palo Alto, CA (US)

(72) Inventors: Charansing Deore, Palo Alto, CA (US); Anuj Patel, Palo Alto, CA (US); Jairam Choudhary, Palo Alto, CA (US)

(73) Assignee: VMware, Inc., Palo Alto, CA (US)

(*) Notice: Subject to any disclaimer, the term of this patent is extended or adjusted under 35 U.S.C. 154(b) by 261 days.

(21) Appl. No.: 16/044,673

(22) Filed: Jul. 25, 2018

(65) Prior Publication Data

US 2020/0034169 A1 Jan. 30, 2020

(51) Int. Cl.
*G06F 9/455* (2018.01)
*G06F 9/50* (2006.01)

(52) U.S. Cl.
CPC ........ *G06F 9/45558* (2013.01); *G06F 9/5027* (2013.01); *G06F 9/5077* (2013.01); *G06F 2009/45562* (2013.01); *G06F 2009/45575* (2013.01); *G06F 2009/45583* (2013.01); *G06F 2009/45591* (2013.01); *G06F 2009/45595* (2013.01)

(58) Field of Classification Search
CPC .. G06F 9/45562; G06F 9/5027; G06F 9/5077; G06F 2009/45562; G06F 2009/45575; G06F 2009/45583; G06F 2009/45591; G06F 2009/45595
See application file for complete search history.

(56) References Cited

U.S. PATENT DOCUMENTS

| | | | | |
|---|---|---|---|---|
| 5,283,888 A * | 2/1994 | Dao | ........................ | G06F 3/16 709/237 |
| 8,065,676 B1 * | 11/2011 | Sahai | .................... | G06F 9/5077 709/226 |
| 8,087,017 B1 * | 12/2011 | Whaley | .................. | G06F 21/64 713/187 |
| 2011/0213886 A1 * | 9/2011 | Kelkar | .................. | G06F 9/5072 709/226 |
| 2014/0165060 A1 * | 6/2014 | Muller | .................. | G06F 9/5022 718/1 |
| 2016/0359981 A1 * | 12/2016 | Ulatoski | ............. | G06F 9/45558 |
| 2019/0384644 A1 * | 12/2019 | Fear | ...................... | A63F 13/358 |

* cited by examiner

*Primary Examiner* — Emerson C Puente
*Assistant Examiner* — Jonathan R Labud

(57) ABSTRACT

Techniques are described for priming virtual machines in advance of the user login, thereby effectively distributing the load on the hosting resources over a wider time interval. A portion of VMs in the pool is allocated for priming. This process is initiated from an advisory service, which can analyze data from different sources, including usage history, rules, and location services. A VM is assigned from the pool and started. One or more application storage volumes and/or writable volumes are attached to the VM. A reclaim timer is then started. If no login event is detected for the user prior to the expiration of the reclaim timer, the VM is reclaimed back in to the pool and made available for other users. If the login event for the user is detected before expiration of the reclaim timer, the user returned the primed VM and the reclaim timer is canceled.

20 Claims, 5 Drawing Sheets

PRIMING VIRTUAL MACHINES IN ADVANCE OF USER LOGIN IN VIRTUAL DESKTOP ENVIRONMENTS

TECHNICAL FIELD

The present disclosure generally relates to virtual desktop environments and more specifically to techniques for priming virtual machines that host virtual desktops prior to user login.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server that is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines (VMs) deployed on a server hardware platform running a hypervisor.

In a typical VDI deployment an important measuring factor is VM density, which indicates the number of virtual machines per host device. Information about the VM density is often used to plan for a VDI deployment at scale for a given workload. Some organizations are facing a problem of scale and performance as the number of users expected to be supported by VDI continue increasing. One major difficulty arises during a "login storm" when several hundred or several thousand virtual machines are logged into within a very short period of time. For example, in a scenario where employees work in shifts, hundreds or thousands of employees may attempt to log into their virtual desktops within a short amount of time during the start of their shift. The hosting infrastructure may have trouble handling such a load, particularly if an insufficient amount of resources has been dedicated to it.

Conventionally in VDI, virtual machines are associated with a pool and consumed on a per-need basis. When a user attempts to get a session with their virtual desktop, a virtual machine is retrieved from the pool of available VMs and customized for that particular user by adding the necessary applications, files and user data to that VM. Once the user stops using the VM, it goes back into the pool and becomes available to other users. In this manner, user applications and data travel with the user as the user moves across different VMs. In order to enable this mobility, a process involving a number of steps typically needs to be carried out in order to customize the VM for a user at the time when the user logs into the VM. This process can take a significant amount of time and place a strain on the hosting infrastructure. During a login storm, when several hundred or thousand users attempt to log into their virtual desktops, the process may result in an unacceptably long login time for the users.

DETAILED DESCRIPTION

Figure 1:
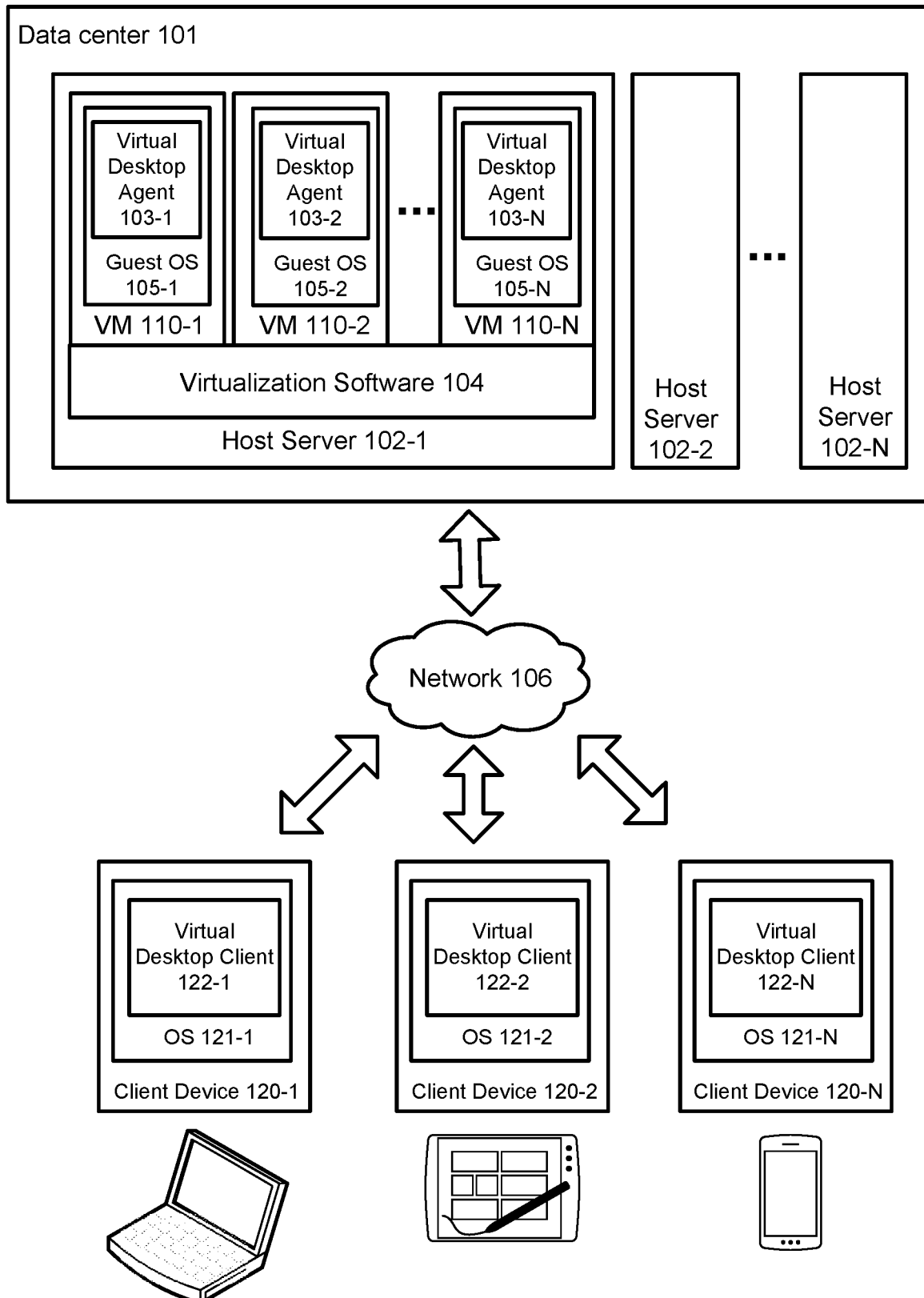
FIG. 1 illustrates an example of a virtual desktop environment, in accordance with various embodiments.

Systems and methods in accordance with various embodiments of the present disclosure overcome at least some of the above-mentioned shortcomings by priming virtual machines in advance of the user login, thereby effectively distributing the load on the VDI resources over a wider time interval. To begin with, a certain percentage or number of virtual machines in the pool can be allocated for priming. This process may be initiated from an advisory service, which can intake and analyze data from a number of different sources, such as usage history, administrator-specified rules, and location services. The data can be analyzed using machine learning techniques to determine which specific users should have VMs primed for them. For example, the advisory service may analyze the historical patterns of user logins learned from collecting usage data related to user login times across the organization in order to determine that a VM should be primed for a specific user at a particular time.

Once the advisory service determines to prime a virtual machine for a user, it begins the priming process by communicating with a connection broker responsible for allocating virtual machines to users. When the advisory service requests the virtual machine, the connection broker allocates a VM from a pool of available virtual machines that have not yet been customized for any particular user and then starts the VM. The VM is customized by adding the applications and user data to the VM, which may be determined based on a database containing user profile or group information. To add an application to the VM, an application storage volume is attached to the VM which contains one or more applications for the user. In one embodiment, the application storage volume is a read-only virtual disk containing the application files (e.g. executables), dynamic-link libraries (DLLs) and registry entries needed to execute the application on the VM. To attach the application storage volume, an application volumes agent mounts the virtual disk on the VM and modifies the registry entries on the operating system of the VM to make the one or more applications executable directly from the virtual disk. In this manner, the applications are added to the VM without the need for a conventional application installation process that would normally need to be executed to add an application to a device. In addition to adding the applications, a writable volume (e.g. delta virtual disk) is attached to the VM in order to store any user files, applications and user data that are added by the user during the use of the VM.

Once the application storage volumes and writable volume have been attached to the virtual machine and the VM has been customized for the user, a reclaim timer is started. If the user does not log into the virtual machine prior to the expiration of the reclaim timer, the virtual machine is reclaimed back in to the pool of available VMs and is made available for other users. If the login event for the user is detected prior to expiration of the reclaim timer, the user is provided with access to the already primed virtual machine and the reclaim timer is canceled. The use of a reclaim timer prevents the primed VMs from being reserved for overly extended lengths of time, which may waste resources in situations where the user fails to login for some unforeseen reason (e.g. where the employee falls ill and does not show up for work).

In this manner, by allocating some number of VMs for priming in advance of the user login, the resource load normally caused by a login storm of users into their desktops is reduced. By priming VMs in small batches for specific users based on login history and other data, the load is distributed over a longer time interval, thereby preventing resources from being overloaded and generally improving performance.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
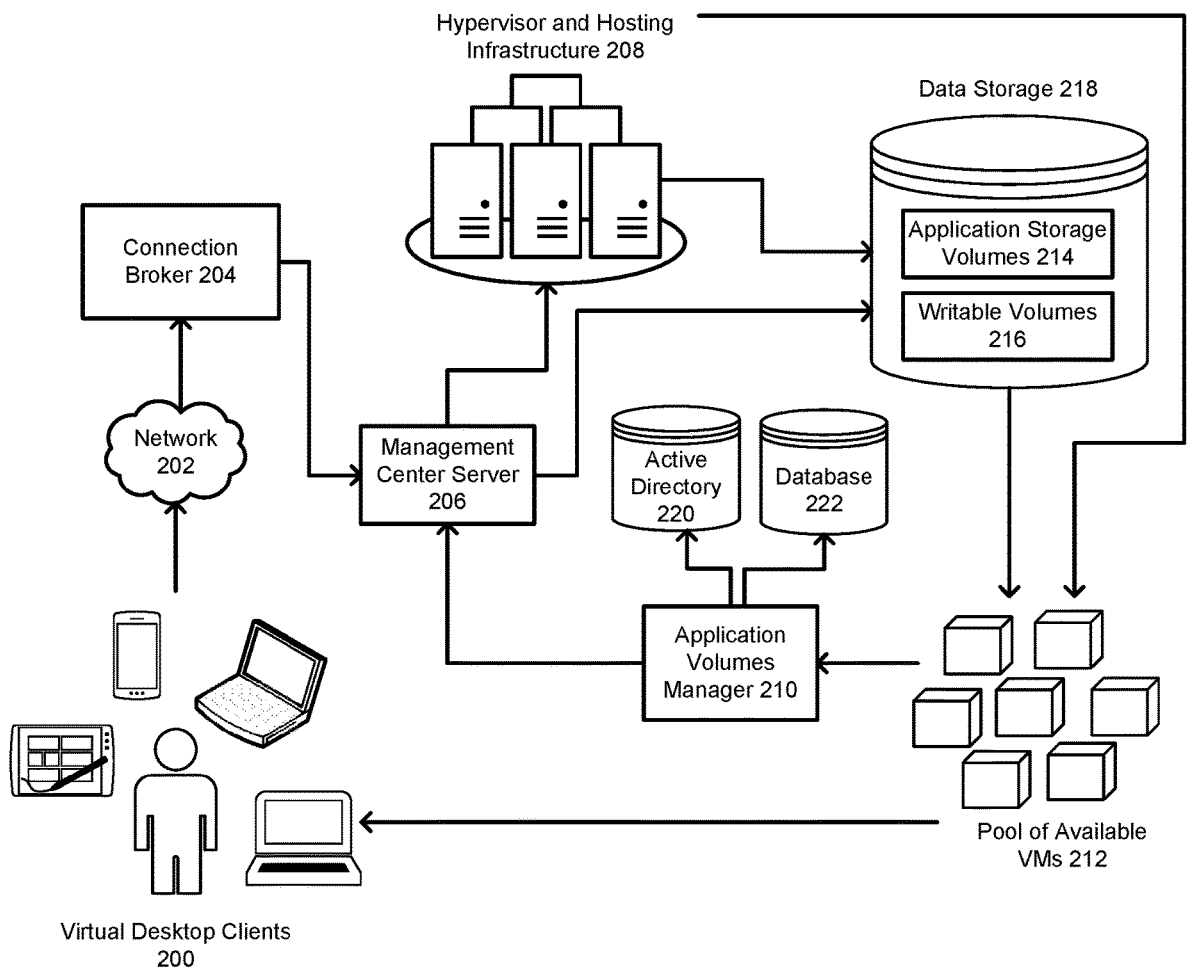
FIG. 2 illustrates an example of providing a custom virtual desktop to a user from a pool of available virtual desktops, in accordance with various embodiments.

FIG. 2 illustrates an example of providing a custom virtual desktop to a user from a pool of available virtual desktops, in accordance with various embodiments. As shown in the illustration, in conventional VDI deployments, a pool 212 of available virtual machines is created, which frequently consists of hundreds or even thousands of VMs. As previously mentioned, the VMs are hosted using hosting infrastructure 208 which includes virtualization software such as a hypervisor executing on host computing devices. One example of a hypervisor is VMware ESXi, included as part of the VMware vSphere suite of products available from VMware, Inc. of Palo Alto, Calif. In order conserve resources and to reduce the hardware requirements for supporting a large number of users, the VMs are typically assigned to users on a per-need basis, meaning that a VM is assigned to a user from the pool 212 when the user requests a session with their virtual desktop. When the user is finished and logs out of their desktop, the VM is returned to the pool and becomes available for other users to use.

In the example shown in FIG. 2, when a user attempts to get a session using their virtual desktop client 200 over the network 202, the connection broker 204 allocates a virtual machine from the pool 212, which is typically a cloned VM (e.g., a linked clone or instant clone). This means that the VM selected from the pool shares some resources with other VMs in the pool and has not yet been customized and made ready for any specific user. For example, it may be that all of the VMs in the pool contain the same operating system and certain applications which are deemed necessary for all employees of the organization (or all employees in a particular organizational role). Cloning virtual machines is a well-known technology and its details will not be described here so as not to obscure the explanation of this illustration.

The connection broker 204 communicates with the management center server 206 which selects a VM from the pool 212 and assigns the selected VM to the user. In various embodiments, the management center server 206 communicates with various other services in the data center in order to provide centralized management, operation and resource provisioning of virtual machines residing in the data center. One example of a management center server 206 is VMware vCenter Server available from VMware, Inc. of Palo Alto, Calif. In order to assign the VM to the user, the management center server 206 communicates with the hypervisor and hosting infrastructure 208.

Once the VM has been assigned to the user, the VM is started and the application volumes manager 210 is notified of the VM about the user login event. The notification is sent by an application volumes agent (not shown in this figure) operating on the virtual machine. Upon detecting the user login to the virtual machine, the application volumes agent sends a notification to the application volumes manager over the network. In various embodiments, the application volumes manager 210 is responsible for attaching application storage volumes 214 to the virtual machine.

The application storage volume 214 contains the executable files, DLLs, registry entries and any other components necessary for executing an application. The application storage volume may be a virtual disk, as available for example in the virtual machine hard disk (VMDK) format or the virtual hard disk (VHD) format. In alternative embodiments, the application storage volume may take a different form, such as hard disk partitions, flash memory portions, or other virtual or non-virtual storage locations. In one embodiment, the application storage volume can be attached by mounting the virtual hard disk containing the application to the computing system and modifying the registry keys, file paths and other information to make the application appear as though it has been locally installed. Alternatively, the act of attaching the application volume may involve mapping or otherwise making available the application volume to the computing system. For example, the volume containing the application may be mapped and registry settings changed to direct future calls of that file type to the application stored in the virtual hard disk. In some embodiments, an application storage volume may contain a single application, while in other embodiments, a single application storage volume may contain multiple applications.

Continuing with the illustration, once the application volumes manager 210 receives the notification that the VM has been assigned to the user, it authenticates the user with the active directory service 220 and checks its database 222 to determine which applications the user should be assigned. The application volumes manager 210 then attaches the application storage volumes 214 containing those applications to the VM by sending instructions to the management center server 206, which attaches the volumes residing in the data storage 218 to the VM. Additionally, the application volumes manager 210 attaches a writable volume 216 to the VM. This writable volume 216 will be used to store any user changes (e.g. files, data etc.) performed while using the VM.

The process illustrated above can take a significant amount of time and place a strain on the management center server 206, application volumes manager 210 and the hypervisor and hosting infrastructure 208. There is also an additional step of preprocessing the application volumes by the application volumes agent on the VM (described later) which also takes a significant portion of time. If these steps are performed at login time by a significantly large number of users simultaneously in a short duration, they may result in an unacceptably long login time for the users.

Figure 3:
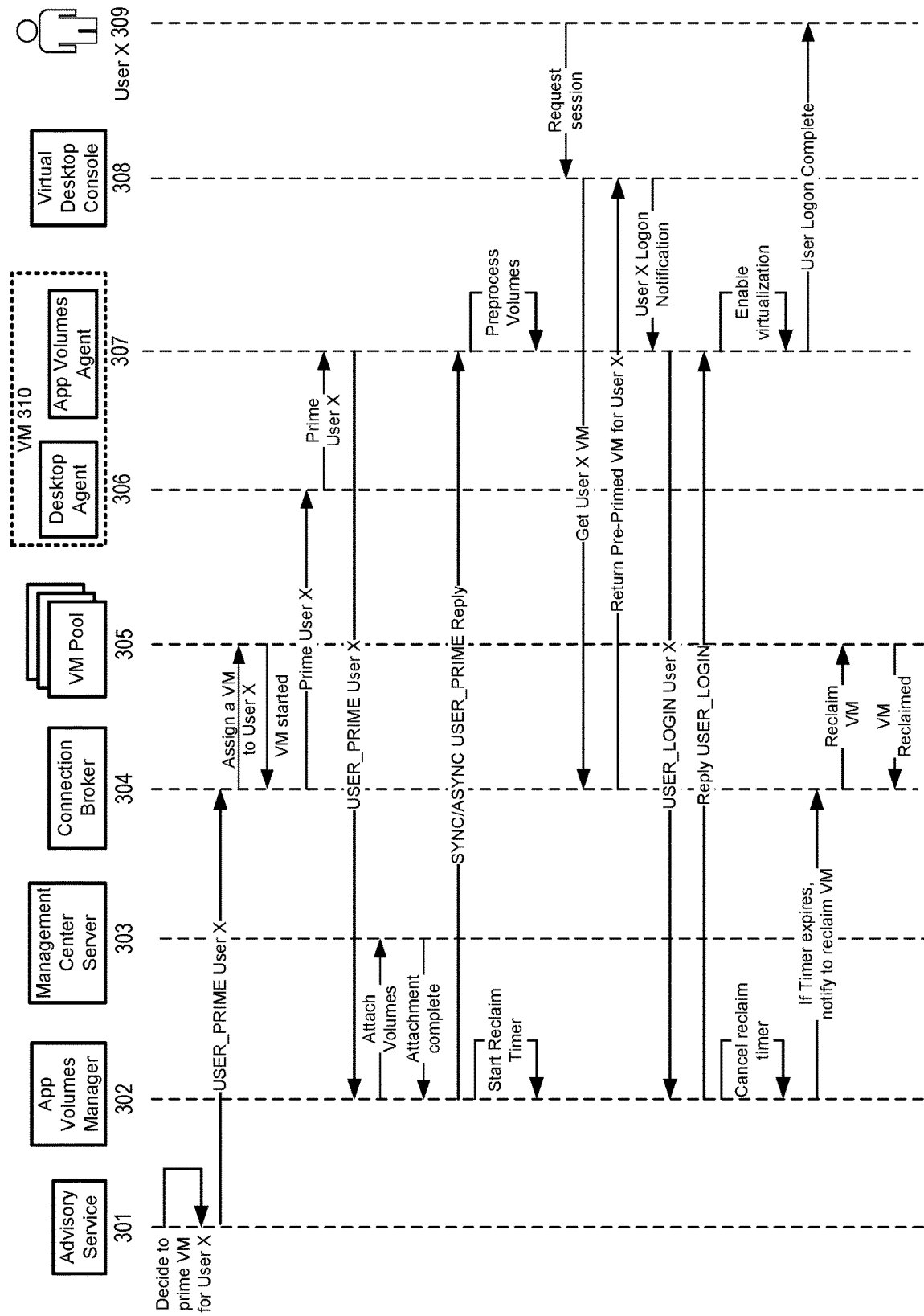
FIG. 3 illustrates an example of priming a virtual machine prior to user login, in accordance with various embodiments.

FIG. 3 illustrates an example of priming a virtual machine prior to user login, in accordance with various embodiments. As shown in the illustration, the process begins when the advisory service 301 determines that a VM should be primed for User X (309). For example, the advisory service may determine based on past usage history of User X that this user will be coming into work within the next 30 minutes. Further details regarding the advisory service 301 will be described later with reference to FIG. 4.

Once the advisory service 301 determines to prime a VM for User X, the advisory service 301 sends a notification (e.g. USER_PRIME event) to the connection broker 304, indicating that the VM should be primed for this user. The connection broker 304 then selects a virtual machine from the VM pool 305 and assigns the VM to User X. The VM is then started and a prime user message is sent to the VM 310 from the connection broker 304. When the VM 310 boots up, the VM contains the virtual desktop agent 306 and the application volumes agent 307. As previously described, the virtual desktop agent is responsible for providing a network connection to the virtual desktop executed on the VM 310, while the application volumes agent is responsible for processing and virtualizing any application storage volumes which will be attached to the VM 310.

The virtual desktop agent 306 receives the message from the connection broker 304 indicating that the VM is being primed. It passes this information to the application volumes agent 307, e.g. via inter-process communication (IPC) call. The application volumes agent 307 then contacts application volumes manager 302 notifying the manager 302 that the user is being primed. The application volumes manager 302 authenticates the user with the active directory service and checks its database to determine which applications should be provided to User X. It then communicates with the management center server 303 to attach the application storage volumes containing those applications to the virtual machine 310. Additionally, the application volumes manager 302 attaches a writable volume to the VM 310 by communicating with the management center server 303. The writable volume is designated for storing user data (e.g. files, applications, data) added or modified by User X any time User X uses his/her virtual desktop.

Once the application storage volumes and the writable volume have been attached to the VM 310, the management center server 302 sends a confirmation to the application volumes manager 302 indicating that the attachment is complete. The application volumes manager 302 then sends a notification to the application volumes agent 307 on the VM 310, indicating that the VM for user X is ready for priming (preprocessing). In some embodiments, the application volumes agent may be designed to detect on its own that the volumes have been attached. Additionally, the application volumes manager 302 starts a reclaim timer for VM 310. Once activated, the reclaim timer begins to count down for a predefined time interval (e.g. 30 minutes) and if the reclaim timer expires before a login event is detected for User X, the VM 310 will be restored to its original state and returned back into the VM pool 305. Alternatively, the VM may be deleted upon expiration. If a login of User X is detected before the reclaim timer expires, the reclaim timer is canceled. In some embodiments, the duration of the reclaim timer may be set by an administrator. In other embodiments, the duration is determined by the advisory service based on historical usage data associated with User X and/or other users.

Once the application volumes agent 307 receives a notification that the attachment is complete, the application volumes agent 307 begins the preprocessing of application storage volumes. As previously mentioned, the attachment of the volumes was performed by the application volumes manager 302 communicating with the management center server 303. The preprocessing of these volumes is performed on the VM 310 by the agent 307. Once the volumes have been attached, all of the virtual disks arrive on the guest operating system (OS) of the VM 310. These devices would normally show up on the guest operating system (as though they were real physical devices attached). The application volumes agent 307 includes a filter driver which will receive a notification indicating that the VM now has a writable volume and one or more application storage volumes. The filter driver will ensure that all of these volumes are loaded in memory, but it will not expose these volumes to the guest operating system nor to the user. The application volumes agent 307 performs the preprocessing of the volumes but does not actually virtualize the volumes until the user logs in. Thus, all of the preprocessing work except actually enabling the volumes (giving visibility of these volumes to the guest operating system) will be performed before the user logs in. In some other embodiments, even the enabling of virtualization of the volumes can be performed immediately after attaching the application volumes and writable.

Continuing with the illustration, at a later time within the reclaim interval, when User X (309) requests a virtual desktop session, the virtual desktop console 308 contacts the connection broker 304 and requests a VM for User X (309). The connection broker 304 is aware that the VM 310 has been primed for User X (309) and returns the VM 310 to the console 308. The console 308 then sends a logon notification to the application volumes agent 307. The application volumes agent 307 sends the user login message to the application volumes manager 302. Normally, it would be at this time that the application volumes manager 302 would go through the process of attaching the volumes. This would cause a delay while the user waits for the attachment and preprocessing to complete. However, in this case, the attachment was already completed during the priming of the VM 310, so the application volumes manager 302 only needs to authenticate User X with the active directory service and may immediately respond to the application volumes agent 307 indicating that the attachment is complete. The application volumes agent 307 can then enable virtualization of the volumes (e.g. by enabling the applications and exposing the VMs on the guest OS, etc.). As a result, the user is able to see a desktop very quickly, often in just a few seconds instead of waiting while of the customizing of the VM is completed at login time. As mentioned previously, in some embodiments the virtualization may have already been enabled during the prime stage, so during the actual login, nothing will need to be done for virtualizing the applications and writable volume.

As described above, there is a number of functions that can be implemented by the application volumes manager 302, the application volumes agent 307, the connection broker 304, the virtual desktop agent 306 in order to enable interaction with the advisory service 301. These functions are described below; however, it should be noted that not all of these functions are required for all embodiments and that some alternative embodiments, may utilize different functions within the scope of the present disclosure.

Application Volumes Manager 302

In one embodiment, the application volumes manager 302 implements data collection for user login times and utilizes an algorithm to create patterns out of this data. The manager 302 can implement the user interface (UI) pages, which will use this pattern and suggest to the administrator the parameters for priming VMs and users/user groups. The manager 302 may also accept configuration parameters from an administrator regarding the duration of the reclaim timer, i.e. how long the VMs can remain primed without the user logging in. The manager 302 may also establish communication with the connection broker 304 to inform the broker that a VM needs to be allocated to a certain user or user group. After this is completed, the manager 302 may implement the reclaim timer. Upon expiration of the reclaim timer, the manager 302 can contact the management center server and request it to reclaim the VM back into VM pool In one embodiment, the manager 302 implements a new event, such as USER_PRIME. This event would work similarly to the USER_LOGIN event with certain differences. In response to USER_PRIME event, the manager 302 would execute the tasks that are performed in response to USER_LOGIN event, such as obtain the list of volumes to be attached from database, send this list to the agent 307, contact the management center server 303 to assign these volumes to the VM and store this VM-User association in the database. In addition, the manager would start the reclaim timer after the attachment of the volumes has completed.

When USER_LOGIN event is detected, the application volumes manager 302 may check its VM-User association from the database to determine if the USER_PRIME event has already been processed for this user. If so, the application volumes manager 302 would only need to authenticate the user and allow the login bypassing all the remaining activities, effectively making it a fast path login. If the USER_PRIME event was not processed for a user, then a conventional login process can be followed which attaches the application volumes and customizes the VM upon user login.

Connection Broker 304

In one embodiment, the connection broker 304 opens a communication channel with the application volumes manager 302. Via this channel, the connection broker 304 provides the manager 302 an ability to request allocation of a VM for given user, such as User X described above. The connection broker 302 may need to populate its database to indicate that the VM has been reserved for the user. When the user logs in via the virtual desktop client, the connection broker should provide the same primed VM for the user and not a new VM. The connection broker may also provide the ability to reclaim the given VM back into the VM pool if the application volumes manager requests this. In one embodiment, the connection broker 304 also informs the desktop agent inside the VM that this VM is only being primed at this time and the user is not yet logging in.

Virtual Desktop Agent 306

In one embodiment, the virtual desktop agent 306 is configured to receive input from the connection broker 304 indicating that the VM is being primed. In response, the virtual desktop agent should open a communication channel with the application volumes agent on the same VM to inform the agent 307 about which user the VM is being primed for.

Application Volumes Agent 307

Figure 4:
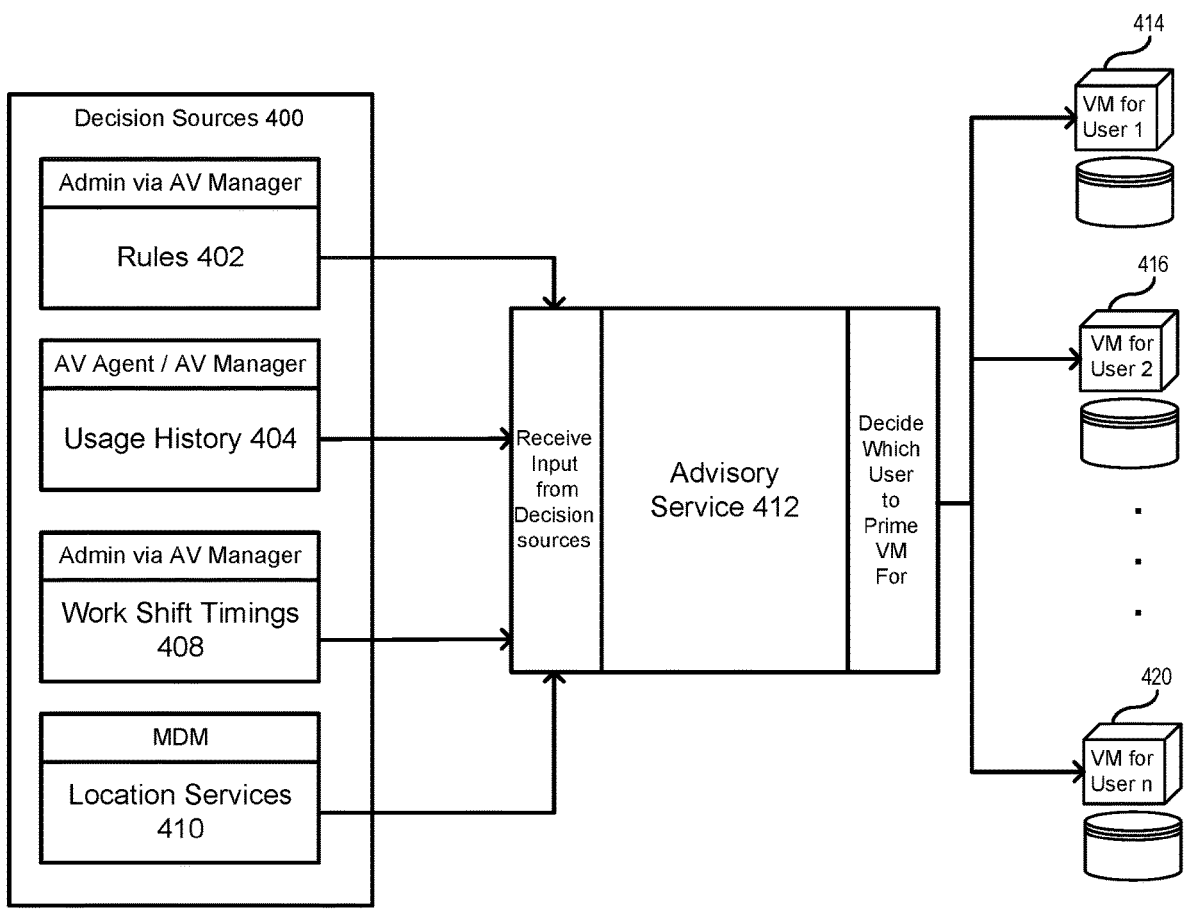
FIG. 4 illustrates an example of an advisory service used to determine when to prime virtual machines, in accordance with various embodiments.

In one embodiment, the application volumes agent 307 is configured to open a communication channel with the virtual desktop agent 306, through which the application volumes agent 307 is notified which user is being primed. Upon receiving this event, the application volumes agent 307 sends a USER_PRIME request to the application volumes manager 303 for the specified user. The response to this event would be very similar to USER_LOGIN event. In one embodiment, the application volumes agent 307 only executes the pre-virtualization scripts for the volumes and gets the volumes ready for virtualization but not actually virtualize these volumes, as previously described FIG. 4 illustrates an example of an advisory service used to determine when to prime virtual machines, in accordance with various embodiments. In various embodiments, the advisory service may be part of the application volumes manager or may interact with the application volumes manager. As shown in the illustration, the advisory service 412 can receive data from a number of different decision sources 400, including rules 402, usage history 404, work shift timings 408 and location services 410. The rules 402 can be specified by the administrator via the application volumes manager. The usage history 404 can be gathered by the application volumes manager and application volumes agent and may include such data as login and logoff times of all users in the organization along, adjusted for weekends and holidays, and the like. The work shift timings information 408 may be specified by the administrator via the application volumes manager or it may be automatically obtained from a database (e.g. HR database). The location services 410 may come from a mobile device management (MDM) system and/or may include such information as iBeacon data, Near Field Communication (NFC) data, information obtained from entry badge swipe machines and the like.

In one embodiment, the application volumes manager can collect the historical data for user login times across all the users over an extended period of time. The advisory service which may reside on the application volumes manager machine or may be integrated as part of the application volumes manager can use machine learning to determine predictable patterns of login time windows for various users. The advisory service can use this pattern to suggest default parameters to the administrator via application volumes manager. The application volumes manager can suggest to the administrator a number of VMs (414, 416, 420) or a percentage of VMs from the pool of available VMs, which can be selected for priming. The pattern will also be used to suggest users or user groups to the administrator that can be selected for priming. Using these suggestions, the administrator is able to make an informed decision to select a certain percentage of VMs from the pool for priming or select certain users for whom the VMs would be primed in advance. The administrator may always be able to override these suggestions and decide his or her own set of rules for determining the number of VMs or percentage of VMs reserved for priming or the users/user groups selected for priming. The administrator may also be able to provide the work shift timings 408 for users, suggesting the times at which shifts for certain users/groups start and end. The administrator may use these approaches to prioritize certain users or user groups to have faster logins.

As previously described in the case of users, the VM can be primed by assigning application storage volumes as well as a writable volume to the selected VM. However, in the case of priming VMs for user groups, only the application volumes will be attached to the VMs and the writable volume will not be attached at the time of priming since the writable volume is directly associated with individual users, while all of the users in a group may require the same applications.

When location service 408 information is used, the advisory service can prioritize the VM Priming for a given user in advance, when it identifies that user is in specific proximity or swipes badge on the time machine or connects to a certain Wi-Fi hotspot etc. For example, when a user comes in on premises in the organization, the user's smartphone frequently connects to the Wi-Fi of the organization. From this connection, the router is able to identify which user has now arrived. This information can be provided to the advisory service and can be used to trigger a VM to be primed for that user, as previously discussed.

Figure 5:
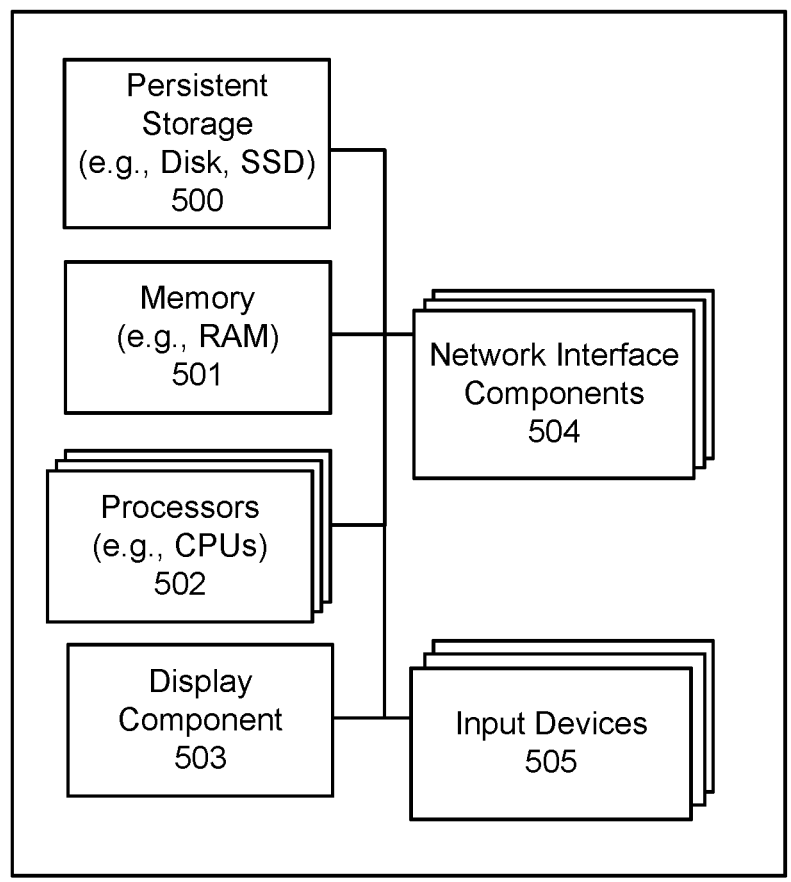
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for virtual machine priming, the method comprising:
   determining to prime a virtual machine for a user prior to detecting a login event for the user;
   priming the virtual machine for the user by:
      assigning the virtual machine to the user from a pool of available virtual machines configured to host virtual desktops, wherein the available virtual machines have not been customized for any specific user;
      determining one or more applications that should be provided to the virtual machine; and
      attaching an application storage volume to the virtual machine assigned to the user, the application storage volume containing the one or more applications;
   once the virtual machine has been primed for the user and before the user has logged into the primed virtual machine, starting a reclaim timer for the virtual machine;
   if the login event for the user is detected prior to expiration of the reclaim timer, providing the user with access to the virtual machine having the attached application storage volume and canceling the reclaim timer;
   if no login event has been detected for the user upon expiration of the reclaim timer, reclaiming the virtual machine back to the pool of virtual machines.

2. The method of claim 1, wherein determining to prime a virtual machine for a user further comprises:
   selecting a subset of virtual machines from the pool of virtual machines for priming and priming each virtual machine in the subset of selected virtual machines.

3. The method of claim 1, further comprising:
   detecting the login event for the user;

determining whether the virtual machine has been primed for the user based on a database containing information associating users with virtual machines; and providing the user with access to the virtual machine if the virtual machine has been primed for the user, otherwise requesting a new virtual machine to be customized for the user from the pool of virtual machines.

4. The method of claim 1, further comprising:

monitoring login events for a plurality of users over a time interval and collecting login times of the login events; and determining a pattern of login time windows for the plurality of users based on login times; and producing default parameters for priming a subset of the virtual machines from the pool of available virtual machines.

5. The method of claim 4, further comprising:

receiving input data overriding the default parameters; and priming the subset of the virtual machines from the pool of available virtual machines based on the input data.

6. The method of claim 1, wherein determining to prime the virtual machine for the user further comprises:

detecting that the user is in a predetermined physical location or within a predetermined physical proximity to the physical location based on one or more location services.

7. The method of claim 1, further comprising:

attaching a writable volume to the virtual machine assigned to the user, the writable volume configured to store user changes performed on the virtual machine.

8. A computing device for virtual machine priming, comprising:

at least one processor; and memory including instructions that, when executed by the at least one processor, cause the computing device to perform operations of:

determining to prime a virtual machine for a user prior to detecting a login event for the user;

priming the virtual machine for the user by:

assigning the virtual machine to the user from a pool of available virtual machines configured to host virtual desktops, wherein the available virtual machines have not been customized for any specific user;

determining one or more applications that should be provided to the virtual machine; and attaching an application storage volume to the virtual machine assigned to the user, the application storage volume containing the one or more applications;

once the virtual machine has been primed for the user and before the user has logged into the primed virtual machine, starting a reclaim timer for the virtual machine;

if the login event for the user is detected prior to expiration of the reclaim timer, providing the user with access to the virtual machine having the attached application storage volume and canceling the reclaim timer;

if no login event has been detected for the user upon expiration of the reclaim timer, reclaiming the virtual machine back to the pool of virtual machines.

9. The computing device of claim 8, wherein determining to prime a virtual machine for a user further comprises:

selecting a subset of virtual machines from the pool of virtual machines for priming and priming each virtual machine in the subset of selected virtual machines.

10. The computing device of claim 8, the memory further comprising instructions that, when executed by the at least one processor, cause the computing device to perform the operations of:

detecting the login event for the user;

determining whether the virtual machine has been primed for the user based on a database containing information associating users with virtual machines; and providing the user with access to the virtual machine if the virtual machine has been primed for the user, otherwise requesting a new virtual machine to be customized for the user from the pool of virtual machines.

11. The computing device of claim 8, the memory further comprising instructions that, when executed by the at least one processor, cause the computing device to perform the operations of:

monitoring login events for a plurality of users over a time interval and collecting login times of the login events; and determining a pattern of login time windows for the plurality of users based on login times; and producing default parameters for priming a subset of the virtual machines from the pool of available virtual machines.

12. The computing device of claim 11, the memory further comprising instructions that, when executed by the at least one processor, cause the computing device to perform the operations of:

receiving input data overriding the default parameters; and priming the subset of the virtual machines from the pool of available virtual machines based on the input data.

13. The computing device of claim 8, wherein determining to prime the virtual machine for the user further comprises:

detecting that the user is in a predetermined physical location or within a predetermined physical proximity to the physical location based on one or more location services.

14. The computing device of claim 8, the memory further comprising instructions that, when executed by the at least one processor, cause the computing device to perform the operation of:

attaching a writable volume to the virtual machine assigned to the user, the writable volume configured to store user changes performed on the virtual machine.

15. A non-transitory computer readable storage medium comprising one or more sequences of instructions, the instructions when executed by one or more processors causing the one or more processors to execute the operations of:

determining to prime a virtual machine for a user prior to detecting a login event for the user;

priming the virtual machine for the user by:

assigning the virtual machine to the user from a pool of available virtual machines configured to host virtual desktops, wherein the available virtual machines have not been customized for any specific user;

determining one or more applications that should be provided to the virtual machine;

attaching an application storage volume to the virtual machine assigned to the user, the application storage volume containing the one or more applications;

once the virtual machine has been primed for the user and before the user has logged into the primed virtual machine, starting a reclaim timer for the virtual machine;

if the login event for the user is detected prior to expiration of the reclaim timer, providing the user with access to the virtual machine having the attached application storage volume and canceling the reclaim timer;

if no login event has been detected for the user upon expiration of the reclaim timer, reclaiming the virtual machine back to the pool of virtual machines.

16. The non-transitory computer readable storage medium of claim 15, wherein determining to prime a virtual machine for a user further comprises:

selecting a subset of virtual machines from the pool of virtual machines for priming and priming each virtual machine in the subset of selected virtual machines.

17. The non-transitory computer readable storage medium of claim 15, further comprising instructions executed by one or more processors causing the one or more processors to execute the operations of:

detecting the login event for the user;

determining whether the virtual machine has been primed for the user based on a database containing information associating users with virtual machines; and providing the user with access to the virtual machine if the virtual machine has been primed for the user, otherwise requesting a new virtual machine to be customized for the user from the pool of virtual machines.

18. The non-transitory computer readable storage medium of claim 15, further comprising instructions executed by one or more processors causing the one or more processors to execute the operations of:

monitoring login events for a plurality of users over a time interval and collecting login times of the login events; and determining a pattern of login time windows for the plurality of users based on login times; and producing default parameters for priming a subset of the virtual machines from the pool of available virtual machines.

19. The non-transitory computer readable storage medium of claim 18, further comprising instructions executed by one or more processors causing the one or more processors to execute the operations of:

receiving input data overriding the default parameters; and priming the subset of the virtual machines from the pool of available virtual machines based on the input data.

20. The non-transitory computer readable storage medium of claim 15, wherein determining to prime the virtual machine for the user further comprises:

detecting that the user is in a predetermined physical location or within a predetermined physical proximity to the physical location based on one or more location services.

* * * * *